United States Patent
Patil et al.

(10) Patent No.: US 10,798,562 B2
(45) Date of Patent: Oct. 6, 2020

(54) DIFFERENTIATION OF DUAL-CONNECTIVITY SPLIT-BEARER WIRELESS ACCESS

(71) Applicant: Verizon Patent and Licensing Inc., Arlington, VA (US)

(72) Inventors: Sudhakar Reddy Patil, Flower Mound, TX (US); Lalit R. Kotecha, San Ramon, CA (US); Violeta Cakulev, Millburn, NJ (US); Glenda T. Baloto, Antioch, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 64 days.

(21) Appl. No.: 15/988,250

(22) Filed: May 24, 2018

(65) Prior Publication Data

US 2019/0364417 A1 Nov. 28, 2019

(51) Int. Cl.
*H04W 8/24* (2009.01)
*H04L 12/24* (2006.01)
*H04L 12/801* (2013.01)
*H04W 88/06* (2009.01)

(52) U.S. Cl.
CPC ........... *H04W 8/24* (2013.01); *H04L 41/0893* (2013.01); *H04L 47/14* (2013.01); *H04W 88/06* (2013.01)

(58) Field of Classification Search
CPC ........ H04W 8/24; H04W 88/06; H04L 47/14; H04L 41/0893
See application file for complete search history.

(56) References Cited

U.S. PATENT DOCUMENTS

| | | | |
|---|---|---|---|
| 8,130,633 B2* | 3/2012 | Gibbs | H04W 36/14 370/216 |
| 9,294,926 B2* | 3/2016 | Pragada | H04W 16/14 |
| 9,510,133 B2* | 11/2016 | Gupta | H04W 4/70 |
| 9,686,677 B2* | 6/2017 | Pinheiro | H04L 65/608 |
| 2015/0358866 A1* | 12/2015 | Xu | H04W 36/00 370/331 |
| 2016/0323798 A1* | 11/2016 | Horn | H04W 36/165 |
| 2017/0048857 A1* | 2/2017 | Vajapeyam | H04W 28/0278 |
| 2017/0331670 A1* | 11/2017 | Parkvall | H04J 11/0056 |
| 2018/0288233 A1* | 10/2018 | Tamura | H04W 76/15 |
| 2019/0182762 A1* | 6/2019 | Mutikainen | H04W 48/18 |
| 2020/0068437 A1* | 2/2020 | Lohr | H04W 76/19 |

* cited by examiner

*Primary Examiner* — Julio R Perez (57) ABSTRACT

Systems and methods described herein enable differentiated policy enforcement for dual connectivity split bearer scenarios. A wireless station receives, from a core network associated with the wireless station, downlink packets directed to an end device that is using a dual-connectivity split bearer. The wireless station directs delivery of the downlink packets over different radio access networks (RANs) of the dual-connectivity split bearer. The wireless station logs a radio access technology (RAT)-type used to deliver each of the downlink packets and sends, based on the logging, a downlink RAT-type feedback report to a network device in the core network. The wireless station receives uplink packets from the end device using the dual-connectivity split bearer, marks each of the uplink packets with a RAT-type indicator, and forwards the marked packets to the network device in the core network.

20 Claims, 8 Drawing Sheets

DIFFERENTIATION OF DUAL-CONNECTIVITY SPLIT-BEARER WIRELESS ACCESS

BACKGROUND

Dual connectivity solutions may be employed when user equipment (UE) can connect to different Radio Access Technology (RAT) types simultaneously. For example, a UE may want to connect to a Long Term Evolution (LTE) network and a Next Generation mobile network for a specific bearer simultaneously.

LTE is a mobile telecommunications standard for wireless communication involving mobile user equipment, such as mobile devices and data terminals. LTE networks include existing Fourth Generation (4G), and 4.5 Generation (4.5G) wireless networks. Next Generation mobile networks, such as Fifth Generation (5G) mobile networks, have been proposed as the next evolution of mobile wireless networks. Next Generation mobile networks are designed to increase data transfer rates, increase spectral efficiency, improve coverage, improve capacity, and reduce latency. The proposed 5G mobile telecommunications standard, among other features, operates in the millimeter wave bands (e.g., 28, 38, and 60 Gigahertz (GHz)), and supports more reliable, massive machine communications (e.g., machine-to-machine (M2M), Internet of Things (IoT)).

DETAILED DESCRIPTION OF THE PREFERRED EMBODIMENTS

The following detailed description refers to the accompanying drawings. The same reference numbers in different drawings may identify the same or similar elements.

Dual connectivity solutions are employed when end devices (e.g., user equipment) can connect to different Radio Access Technology (RAT) types simultaneously. For example, with development of future generation radio technologies, such as Fifth Generation New Radio (5G NR), an end device will be able to connect simultaneously to a 5G NR radio access network (RAN) and an Evolved Universal Mobile Telecommunications System (UMTS) Terrestrial Radio Access Network (E-UTRAN) of a Long Term Evolution (LTE) network for a specific bearer. In such cases, downlink and uplink packets can be transmitted over either/both of the radio access technologies. Thus, the wireless access portion of the bearer (e.g., a logical channel with particular end-to-end quality of service (QoS) requirements) may be split among different types of access networks.

It may be desirable for a service provider to differentiate between services provided to an end device simultaneously over these different RAT types. For example, differentiated quality of service (QoS) and charging policies could be applied by network devices in the core network, based on RAT types used for uplink or downlink communications. However, decisions to route packets over either radio access network in a dual connectivity scenario are currently made by devices outside the wireless core network, and no mechanism exists to report these routing decisions to devices in the core network.

Systems and methods described herein enable differentiated policy enforcement for dual-connectivity split-bearer scenarios. A wireless station may receive, from a core network associated with the wireless station, downlink packets directed to an end device that is using a dual-connectivity split bearer. The wireless station may direct delivery of the downlink packets over different RANs of the dual-connectivity split bearer. The wireless station may log a RAT-type used to deliver each of the downlink packets and may send, based on the logging, a downlink RAT-type feedback report to a network device in the core network. The wireless station may receive uplink packets from an end device using the dual-connectivity split bearer, may mark each of the uplink packets with a RAT-type indicator, and may forward the marked packets to the network device in the core network.

Figure 1:
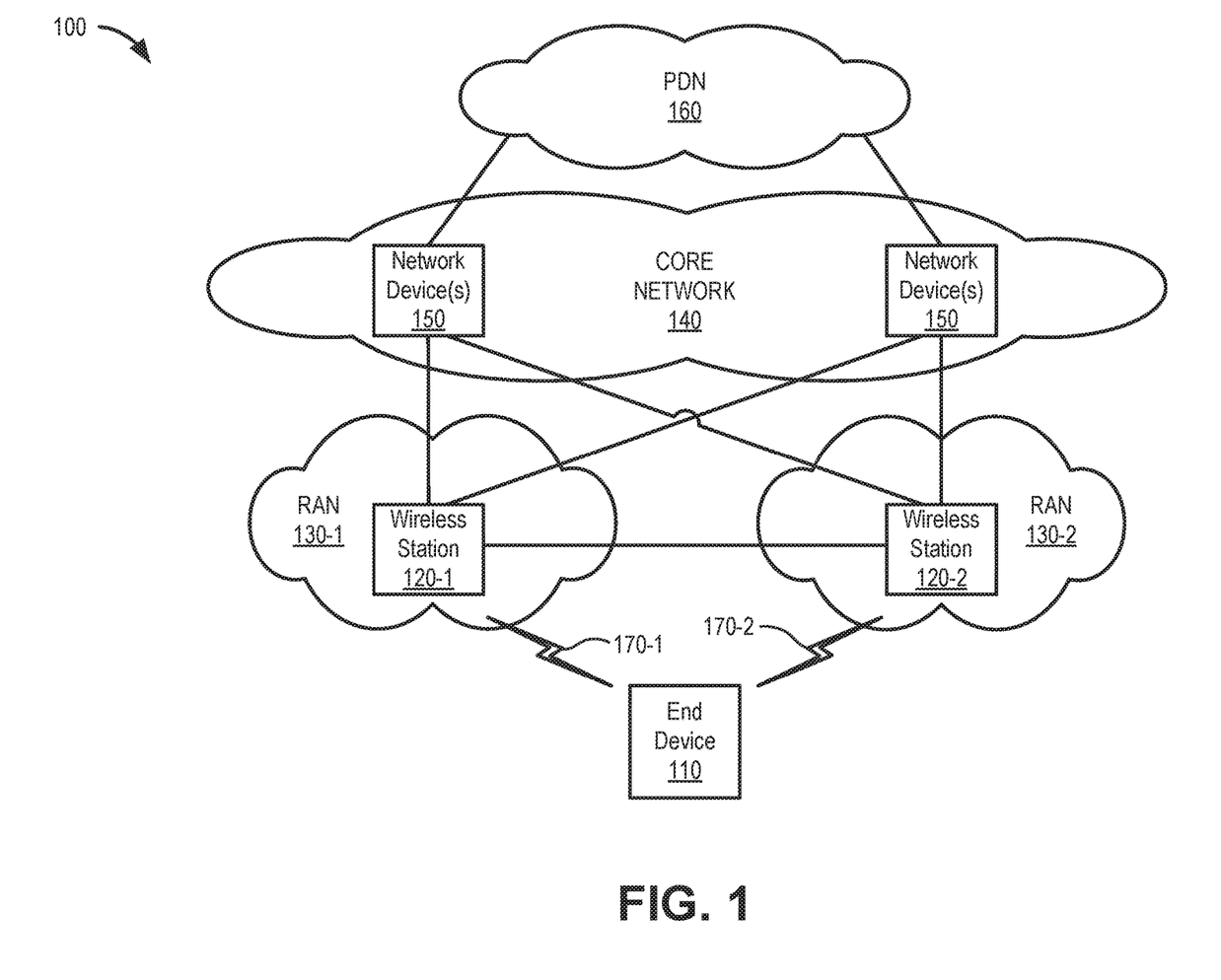
FIG. 1 is a diagram illustrating a network environment according to an implementation described herein.

FIG. 1 is a diagram of an exemplary environment 100 in which the systems and/or methods, described herein, may be implemented. As shown in FIG. 1, environment 100 may include an end device 110, a wireless station 120-1 for one type of RAN 130-1, a wireless station 120-2 for a different type of RAN 130-2, a core network 140 with network devices 150, and a packet data network (PDN) 160. Wireless stations 120-1 and 120-2 may be referred to herein collectively as wireless stations 120 and generically as wireless station 120, and RAN 130-1 and RAN 130-2 may be referred to herein collectively as RANs 130 and generically as RAN 130. According to other embodiments, environment 100 may include additional networks, fewer networks, and/or different types of networks than those illustrated and described herein.

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

In the configuration of FIG. 1, end device 110 may use wireless channels 170-1 and 170-2 (referred to collectively as wireless channels 170) to access wireless stations 120-1 and 120-2, respectively. Wireless channels 170 may correspond, for example, to physical layer protocols in accordance with different RAT types. For example, wireless channel 170-1 may correspond to physical layer protocols for 4G RAN standards (e.g., 3GPP standards for 4G air interfaces, etc.), while wireless channel 170-2 may correspond to physical layer protocols for 5G New Radio standards (e.g., 3GPP standards for 5G air interfaces, etc.). As described further herein, wireless channels 170 may be used to provide communications to/from end device 110 using a dual-connectivity split bearer.

End device 110 may include any type of mobile device having multiple coverage mode capabilities, and thus communicate simultaneously with different wireless stations (e.g., wireless stations 120) using different wireless channels (e.g., channels 170) corresponding to the different RANs (e.g., RANs 130). End device 110 may be a mobile device that may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, end device 110 may be implemented as a machine-type communications (MTC) device, an Internet of Things (IoT) device, a machine-to-machine (M2M) device, etc. According to implementations described herein, end device 110 may be provisioned (e.g., via a subscriber identity module (SIM) card or another secure element) to recognize particular network identifiers (e.g., associated with RANs 130).

Wireless station 120 may include a network device that has computational and wireless communicative capabilities. Wireless station 120 may include a transceiver system that connects end device 110 to other components of RAN 130 and core network 140 using wireless interfaces. Wireless station 120 may be implemented as a base station (BS), a base transceiver station (BTS), a Node B, an evolved Node B (eNB), an evolved LTE (eLTE) eNB, a next generation Node B (gNB), a remote radio head (RRH), an RRH and a baseband unit (BBU), a BBU, or other type of wireless node (e.g., a picocell node, a femtocell node, a microcell node, etc.) that provides wireless access to one of RANs 130. Each wireless station 120 may support a RAN 130 having different RAT-types. For example, in one implementation, RAN 130-1 may include an E-UTRAN for an LTE network, while RAN 130-2 may include a 5G NR RAN.

According to an exemplary embodiment, one of wireless stations 120 includes logic that enables the wireless station 120 to serve as a dual connectivity anchor point to deliver packets received from core network 140 to end device 110 via either wireless channel 170-1 or wireless channel 170-2. Additionally, the wireless station 120 includes logic that enables wireless station 120 to receive packets from end device 110 via either wireless channel 170-1 or wireless channel 170-2. Routing decisions for using wireless channel 170-1 or wireless channel 170-2 may be made by the wireless station 120 that serves as the anchor point.

Core network 140 may include one or multiple networks of one or multiple types. For example, core network 140 may be implemented to include a terrestrial network and/or a satellite network. According to an exemplary implementation, core network 140 includes a complementary network pertaining to multiple RANs 130. For example, core network 140 may include the core part of an LTE network, an LTE-A network, a 5G network, a legacy network, and so forth.

Depending on the implementation, core network 140 may include various network elements that may be implemented in network devices 150. Such network elements may include a mobility management entity (MME), a user plane function (UPF), a session management function (SMF), a core access and mobility management function (AMF), a unified data management (UDM), a packet data network gateway (PGW), a serving gateway (SGW), a policy control function (PCF), a home subscriber server (HSS), as well other network elements pertaining to various network-related functions, such as billing, security, authentication and authorization, network polices, subscriber profiles, network slicing, and/or other network elements that facilitate the operation of core network 140.

PDN 160 may include one or more networks, such as a local area network (LAN), a wide area network (WAN), a metropolitan area network (MAN), a telephone network, the Internet, etc., capable of communicating with end devices 110. In one implementation, PDN 160 includes a network that provides data services (e.g., via packets or any other Internet protocol (IP) datagrams).

The number and arrangement of devices in environment 100 are exemplary. According to other embodiments, environment 100 may include additional devices and/or differently arranged devices, than those illustrated in FIG. 1.

Figure 2:
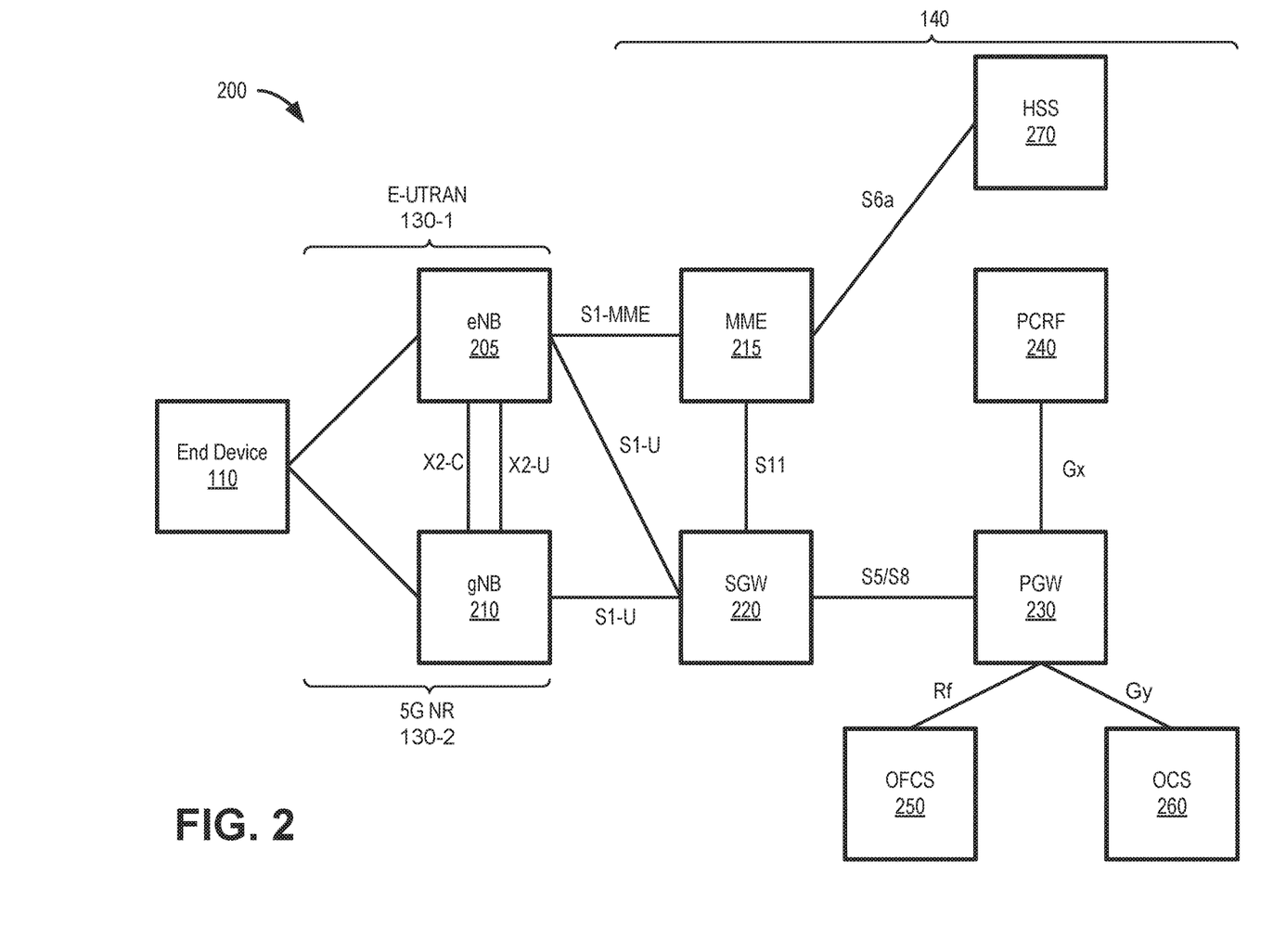
FIG. 2 is a diagram illustrating connections among devices in an exemplary portion of the network environment of FIG. 1.

FIG. 2 is a diagram illustrating connections among devices in an exemplary portion 200 of network environment 100. In the configuration of FIG. 2, dual connectivity capability is provided to end device 110 using E-UTRAN 130-1 and 5G NR RAN 130-2. Wireless stations 120-1 and 120-2 for RANs 130-1 and 130-2 may be implemented as eNB 205 and gNB 210, respectively. Core network 140 may include network elements of an Evolved Packet Core (EPC, also referred to as 4G core). As shown in FIG. 2, core network 140 may include an MME 215 device, an SGW device 220, a PGW device 230, a Policy Charging Rules Function (PCRF) device 240, an offline charging system (OFCS) device 250, an online charging system device (OCS) 260, and an HSS device 270. In other implementations, core network 140 may include network elements for a 5G core.

eNB 205 may include one or more devices and other components having functionality that allow end device 110 to wirelessly connect to RAN 130-1. eNB 205 may interface with core network 140 via a S1 interface, which may be split into a control plane S1-MME interface and a user plane S1-U interface. S1-MME interface may provide an interface between eNB 205 and MME device 215. The S1-U interface may provide an interface between eNB 205 and SGW 220. The S1-U interface may be implemented, for example, using a General Packet Radio Service (GPRS) Tunneling Protocol User Plane (GTPv2-U). In the configuration of FIG. 2, eNB 205 serves as a "master" node, while gNB 210 serves as a secondary node.

gNB 210 may include one or more devices and other components having functionality that allow end device 110 to wirelessly connect to 5G NR RAN 130-2. gNB 210 may interface with SGW 220 of core network 140 via an S1-U interface. eNB 205 and gNB 210 may communicate with each other via an X2 interface. An X2 interface may be implemented, for example, with a protocol stack that includes an X2 application protocol and Stream Control Transmission Protocol (SCTP). As shown in FIG. 2, X2 interface may be divided into a control plane interface, X2-C, and a user plane interface, X2-U. X2-C interface may be used to coordinate uplink and downlink packet delivery for end device 110. X2-U interface may be used to route data packets for end device 110 between eNB 205 and gNB 210.

MME device 215 (also simply referred to as MME 215) may include a network device that implements control plane processing for core network 140. For example, MME 215 may implement tracking and paging procedures for end device 110, may activate and deactivate bearers for end device 110, may authenticate a user of end device 110, and may interface to non-LTE RANs, such as 5G NR RAN 130-2. MME 215 may also select a particular SGW 220 for end device 110. MME 215 may communicate with SGW 220 through an S11 interface. The S11 interface may be implemented, for example, using GTPv2. The S11 interface may be used to create and manage a new session for a particular end device 110.

SGW device 220 (also simply referred to as SGW 220) may provide an access point to and from end device 110, may handle forwarding of data packets for end device 110, and may act as a local anchor point during handover procedures between eNBs 205 and/or gNBs 210. SGW 220 may interface with PGW 230 through an S5/S8 interface. The S5/S8 interface may be implemented, for example, using GTPv2.

PGW device 230 (also simply referred to as PGW 230) includes a network or computational device that functions as a gateway to PDN 160. In one exemplary implementation, PGW 230 may be a traffic exit/entry point for core network 140. End device 110 may connect to PGW 230 via one or more tunnels established between gNB 210 and PGW 230, such as one or more GTP tunnels. End device 110 may simultaneously connect to more than one PGW for accessing multiple PDNs 160. PGW 230 may perform policy enforcement, packet filtering for each user, charging support, lawful intercept, and packet screening. PGW 230 may also act as an anchor for mobility between 3GPP and non-3GPP technologies. According to implementations described herein, PGW 230 may monitor uplink and downlink data transfers for individual end devices 110 and enforce policies for different RAT types used in a dual-connectivity split bearer. For example, PGW 230 may enforce different policies and/or apply different charging codes for packets sent to/from end device 110 using E-UTRAN 130-1 and 5G NR RAN 130-2.

PCRF device 240 (also simply referred to as PCRF 240) may include a network or computational device that provides policy control decision and flow based charging control functionalities. PCRF 240 may provide network control regarding service data flow detection, gating, QoS and flow based charging, etc. PCRF 240 may determine how a data stream is treated once mapped to a bearer, and may ensure that the user plane traffic mapping and treatment is in accordance with a user's subscriber profile. According to an implementation described herein, PCRF 240 may communicate with PGW 230 using a Gx interface. The Gx interface may be implemented, for example, using a Diameter-based protocol.

OFCS 250 (also simply referred to as OFCS 250) device may include a network or computational device that serves as an offline (post-paid) management system for services provided to end device 110. According to implementations described herein, PGW 230 may provide feedback reports for uplink and downlink packet delivery for end device 110 over a dual-connectivity split bearer. OFCS 250 may receive information from PGW 230 via an Rf interface, implemented, for example, using a Diameter protocol.

OCS device 260 (also simply referred to as OCS 260) may include a network or computational device that serves as a credit management system that may affect, in real-time, services provided to end device 110. OCS 260 may store account settings, such a data usage plan limits, for individual accounts. Some accounts may include multiple subscribers (e.g., multiple end devices 110). OCS 260 may log data usage per account and/or per subscriber. According to implementations described herein, PGW 230 may provide real-time or near-real time feedback for uplink and downlink packet delivery for end device 110 over a dual-connectivity split bearer. OCS 260 may receive information from PGW 230 via a Gy interface implemented, for example, using a Diameter protocol.

HSS device 270 (also simply referred to as HSS 270) may store information associated with end device 110 and/or information associated with users/owners of end device 110. For example, HSS 270 may store user profiles, such as a Subscriber Profile Repository (SPR), that include authentication and access authorization information. As described further herein, the subscriber profiles may store use restrictions or bearer preferences for a particular end device 110, such as restricting a particular end device 110 to certain aggregated bandwidth limits over a dual-connectivity split bearer. HSS 270 may communicate with MME 215 through an S6a interface. The subscriber profile may also identify particular services to which a user of end device 110 has subscribed.

Figure 3:
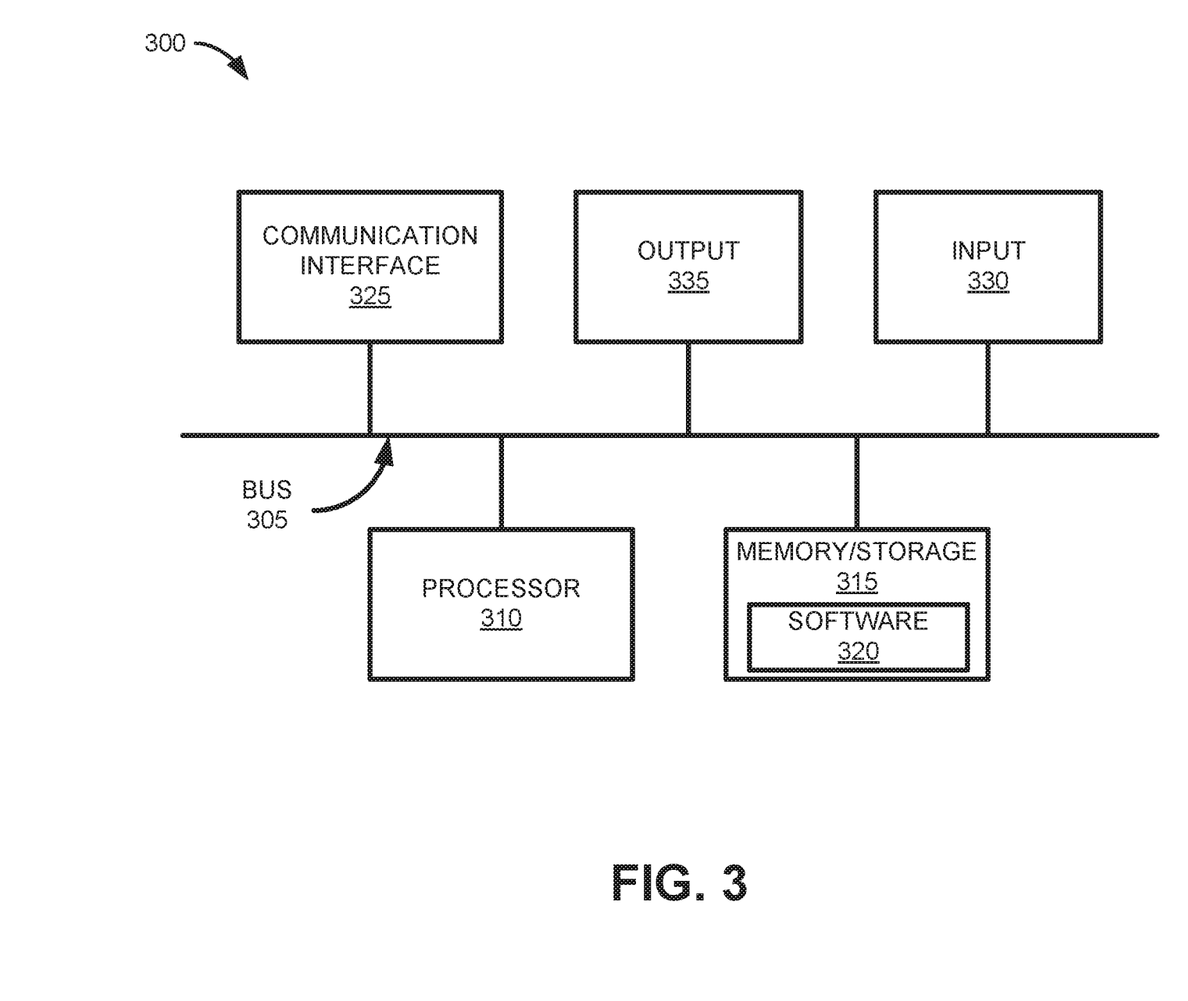
FIG. 3 is a diagram of exemplary components that may be included in one or more of the devices shown in FIGS. 1 and 2.

FIG. 3 is a diagram illustrating exemplary components of a device 300 that may correspond to one or more of the devices described herein. For example, device 300 may correspond to components included in end device 110, eNB 205, gNB 210, MME 215, SGW 220, PGW 230, PCRF 240, OFCS 250, OCS 260, and HSS 270. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, end device 110 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4A:
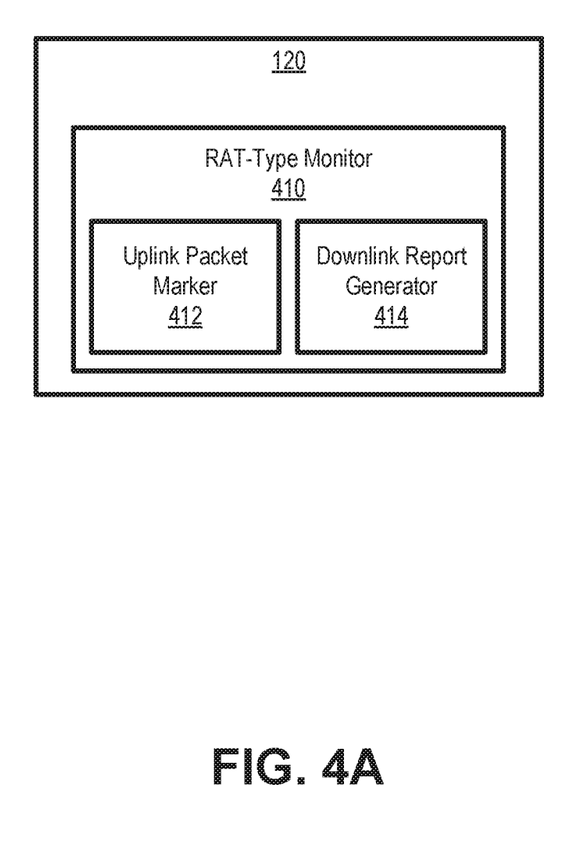
FIG. 4A is a block diagram of exemplary logical components of one of the wireless stations of FIG. 1.

FIG. 4A is a block diagram illustrating logical components of a wireless station 120, such as eNB 205 or gNB 210. The logical components of FIG. 4A may be implemented, for example, by processor 310 in conjunction with memory 315/software 320. As shown in FIG. 4A, wireless station 120 may include a RAT-type monitor 410 that has an uplink packet marker 412 and a downlink report generator 414. RAT-type monitor 410 may differentiate between packets sent or received via different RANs. For example, when gNB 210 serves as an anchor point for a dual connectivity bearer, gNB 210 may differentiate between packets traversing 5G NR RAN 130-2 and packets that use eNB 205 to traverse a combination of an X2-U interface and E-UTRAN 130-1. RAT-type monitor 410 may detect if a packet in a dual connectivity bearer has been transmitted (e.g., for uplink packets) or received (e.g., for downlink packets) over one of two available RANs, such as E-UTRAN 130-1 or 5G NR RAN 130-2.

Uplink packet marker 412 may indicate which RAT type, in a dual connectivity bearer, was used for a particular uplink packet. For example, when uplink packet marker 412 is implemented in gNB 210, gNB 210 may receive a packet via a RAN (e.g., directly from end device 110) or via an X2-U interface (e.g., from end device 110 via eNB 205). Uplink packet marker 412 may provide an indication in the GTP header of each packet to identify the RAT type used. Uplink packet marker 412 may forward the marked packets to SGW 220, where the information may be forwarded to other network elements in core network 140 for policy shaping, etc.

Downlink report generator 414 may indicate which RAT type, in a dual connectivity bearer, is used for particular downlink packets. Downlink packets may be sent from SGW 220 to gNB 210, and gNB 210 transmits the packets over either 5G NR RAN 130-2 or E-UTRAN 130-1 (via eNB 205). Downlink report generator 414 may create a feedback report to identify the RAT type used for individual downlink packets or a range of packets for a particular bearer. Downlink report generator 414 may provide feedback reports to SGW 220. The feedback reports may include, for example, the RAT type used for a sequence of downlink packets (multiple such sequences can be included in the report), a sequence of packets that were dropped (if any), and an indicator that the report is an initial, intermediate, or final report for a dual connectivity bearer.

Figure 4B:
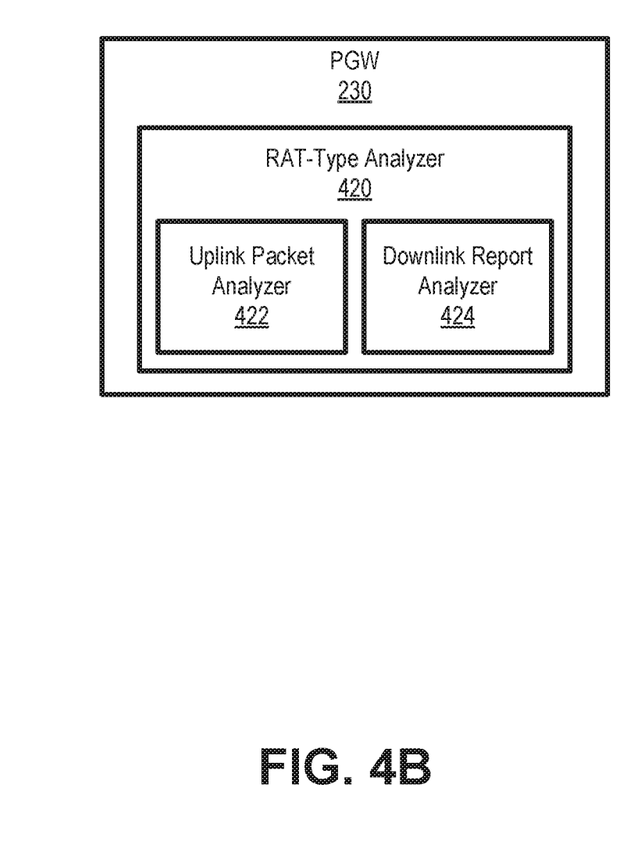
FIG. 4B is a block diagram of exemplary logical components of packet gateway (PGW) device of FIG. 2.

FIG. 4B is a block diagram illustrating logical components of PGW 230. The logical components of FIG. 4B may be implemented, for example, by processor 310 in conjunction with memory 315/software 320. As shown in FIG. 4B, PGW 230 may include a RAT-type analyzer 420 that has an uplink packet analyzer 422 and a downlink report analyzer 424. Generally, RAT-type analyzer 420 may receive marked uplink packets and/or downlink feedback reports from an anchor point (e.g., gNB 210 or eNB 205). RAT-type analyzer 420 may evaluate uplink GTP packet headers and downlink feedback reports to enforce differentiated QoS and charging policies based on the RAT type used. RAT-type analyzer 420 may also compile and/or provide RAT type usage indications for each end device 110 to other network devices, such as PCRF 240.

Uplink packet analyzer 422 may receive marked packets from an anchor point (e.g., uplink packet marker 412) and may compare uplink packet RAT type use with policies for the particular bearer and/or end device 110. For example, uplink packet analyzer 422 may apply different charging policies or different QoS to uplink packets received via E-UTRAN 130-1 versus 5G NR RAN 130-2.

Downlink report analyzer 424 may receive feedback reports from an anchor point (e.g., downlink report generator 414) and may compare downlink packet RAT type use with policies for the particular bearer and/or end device 110. For example, downlink report analyzer 424 may apply different charging policies or different QoS to uplink packets received via E-UTRAN 130-1 versus 5G NR RAN 130-2.

Although FIGS. 4A and 4B show exemplary logical components of wireless station 120 and PGW 230, in other implementations, wireless station 120 and/or PGW 230 may include fewer logical components, different logical components, or additional logical components than depicted in FIGS. 4A and 4B. For example, in another implementation, wireless station 120 and PGW 230 may use feedback reports and report analyzers for both uplink and downlink packets (e.g., instead of marking uplink packets). Additionally or alternatively, one or more logical components of wireless station 120 and/or PGW 230 may perform functions described as being performed by one or more other logical components.

Figure 5:
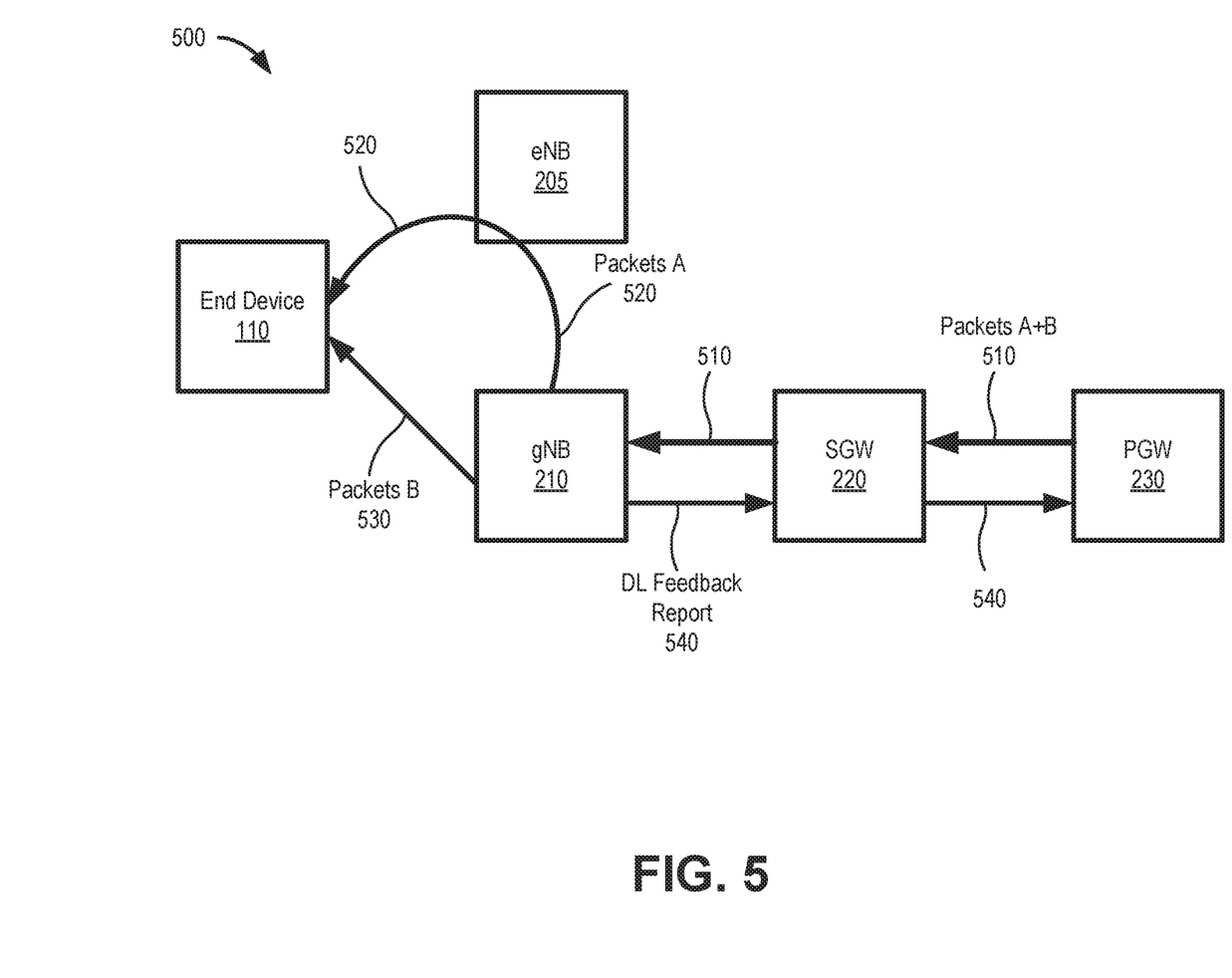
FIG. 5 is a diagram illustrating exemplary communications for tracking per-packet downlink data transmissions over a dual-connectivity split bearer in a portion of the network environment of FIG. 2.

FIG. 5 is a diagram illustrating exemplary communications for tracking per-packet downlink data transmissions over a dual-connectivity split bearer in a portion 500 of network environment 100. Network portion 500 may include end device 110, eNB 205, gNB 210, SGW 220, and PGW 230.

As shown in FIG. 5, gNB 210 serves as the anchor point for a dual-connectivity split bearer to end device 110. GTP-U may be used as the protocol for packet communication between PGW 230, SGW 220 and eNB 205/gNB 210. Downlink packets 510, including packets A and B, are sent from PGW 230 to SGW 220 (e.g., via an S5 interface), and from SGW 220 to gNB 210 (e.g., via an S1-U interface).

gNB 210 receives downlink packets 510 and determines how to transmit packets 510 (e.g., over 5G NR RAN 130-2 or E-UTRAN 130-1). The determination to use 5G NR RAN 130-2 or E-UTRAN 130-1 for packets 510 is made dynamically by gNB 210 based on congestion levels, packet classification, air interface conditions, etc. In the example of FIG. 5, gNB 210 may route packet A 520 to eNB 205 (e.g., via an X2-U interface) and eNB 205 may send packet A to end device 110 via E-UTRAN 130-1. Conversely, gNB 210 may route packet B 530 directly to end device 110 via 5G NR RAN 130-2.

At this point, gNB 210 has knowledge or information regarding which of downlink packets 510 have been transmitted over 5G NR RAN 130-2 or E-UTRAN 130-1. gNB 210 (e.g., downlink report generator 414) can send a downlink (DL) feedback report 540 to SGW 220 (e.g., via the S1-U interface). According to one implementation, downlink feedback report 540 may include information regarding multiple downlink packets (e.g., including packets A, B, and other packets). Downlink feedback report 540 may associate a range or sequence of downlink packets with a RAT type (e.g., E-UTRAN 130-1 or 5G NR RAN 130-2) and whether any packets were dropped, a range or sequence of packet numbers that were dropped, a total amount (e.g., in bytes or megabytes) of packets that were dropped, etc. In one implementation, downlink feedback report 540 may also provide a report category to indicate whether the report is an initial report, an intermediate report, a final report, or an only (sole) report for a particular dual-connectivity split bearer. The amount or range of packets covered in each downlink feedback report 540, or the time interval between intermediate reports, may be configured to support, for example, online charging and/or policy enforcement. In the example of FIG. 5, downlink feedback report 540 may indicate a range of packet sequence numbers delivered over E-UTRAN 130-1 (e.g., including packet A) and another range of packet sequence numbers delivered over 5G NR RAN 130-2 (e.g., including packet B).

SGW 220 may receive downlink feedback report 540 and may forward downlink feedback report 540 to PGW 230 (e.g., via the S5 interface). Based on downlink feedback report 540 (or a compilation of multiple feedback reports 540), PGW 230 can apply appropriate charging policies.

While FIG. 5 illustrates exemplary communications for tracking per-packet downlink data transmissions over a dual-connectivity split bearer, according to other embodiments, network elements of network portion 500 may perform additional, different, and/or fewer communications. Alternatively, new or modified messages and/or new or modified interfaces associated with the network elements may be implemented to accomplish similar tasks as described.

Figure 6:
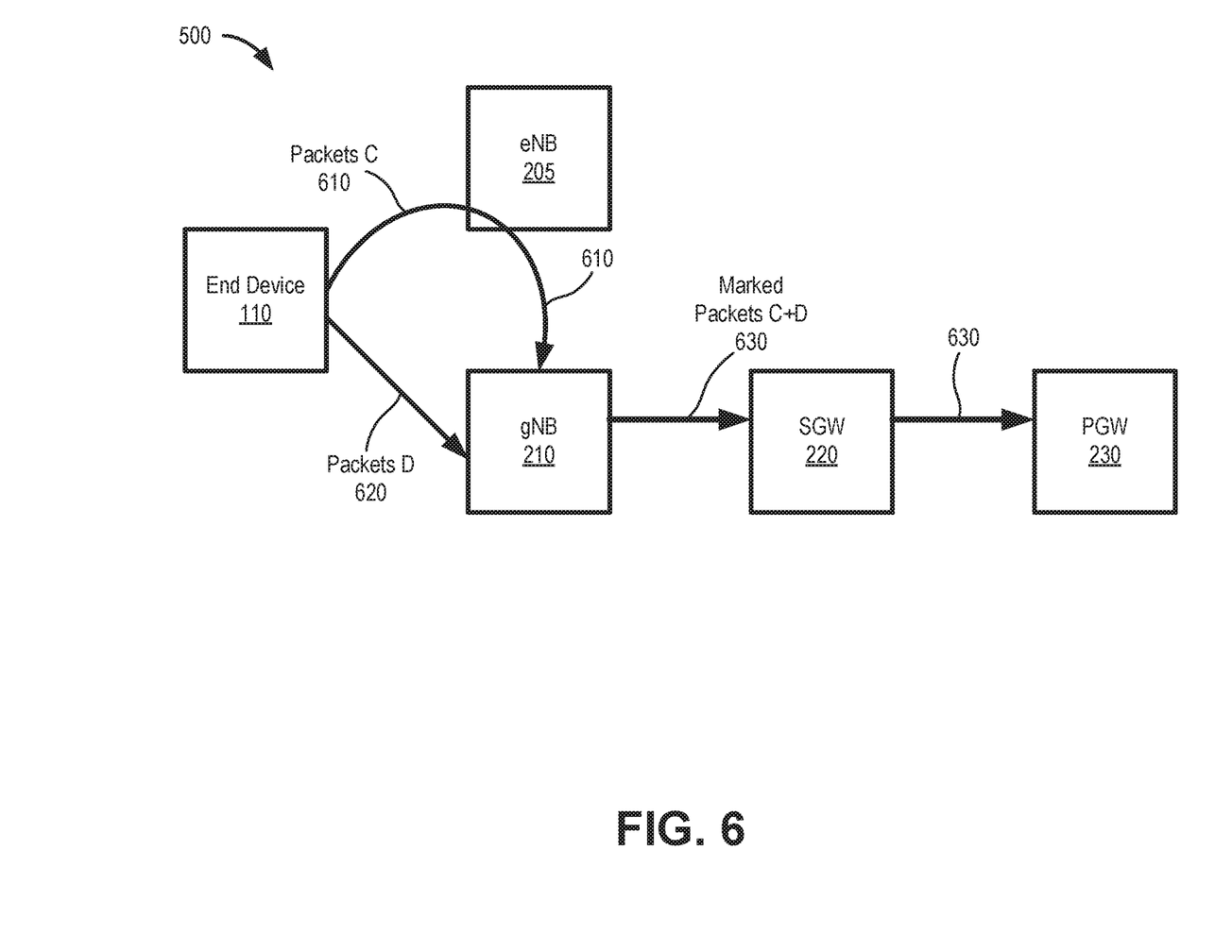
FIG. 6 is a diagram illustrating exemplary communications for tracking per-packet uplink data transmissions over a dual-connectivity split bearer in the portion of the network environment of FIG. 5.

FIG. 6 is a diagram illustrating exemplary communications for tracking per-packet uplink data transmissions over a dual-connectivity split bearer in portion 500 of network environment 100. Similar to FIG. 5, in FIG. 6, gNB 210 serves as the anchor point for a dual-connectivity split bearer to end device 110. GTP-U may be used as the protocol for packet communication between PGW 230, SGW 220 and eNB 205/gNB 210.

As shown in FIG. 6, end device 110 may employ a dual-connectivity split bearer by sending uplink packets C 610 to eNB 205 via E-UTRAN 130-1 (which eNB 205 forwards to gNB 210 via an X2-U interface) and sending uplink packets D 620 via 5G NR RAN 130-2. gNB 210 may receive uplink packets C 610 and uplink packets D 620.

At this point, gNB 210 has knowledge or information regarding which of uplinks packets 610 and 620 have been transmitted over E-UTRAN 130-1 or 5G NR RAN 130-2. gNB 210 (e.g., uplink packet marker 412) may mark each packet with a RAT type indicator corresponding to the RAT over which the packet was delivered (e.g., E-UTRAN 130-1 or 5G NR RAN 130-2). In one implementation, packet marking may be added as a RAT-type indicator in the GTP header of each packet before each packet is forwarded from gNB 210 to SGW 220 (e.g., via the S1-U interface). Thus, as shown in FIG. 6, marked packets 630 may include individual packets C marked to indicate E-UTRAN 130-1 and individual packets D marked to indicate 5G NR RAN 130-2.

SGW 220 may receive marked packets 630 and may forward marked packets 630 to PGW 230 (e.g., via the S5 interface). Based on marked packets 630 (or a compilation of multiple marked packets 630), PGW 230 can apply appropriate charging policies.

While FIG. 6 illustrates exemplary communications for tracking per-packet uplink data transmissions over a dual-connectivity split bearer, according to other embodiments, network elements of network portion 500 may perform additional, different, and/or fewer communications. Alternatively, new or modified messages and/or new or modified interfaces associated with the network elements may be implemented to accomplish similar tasks as described.

Figure 7:
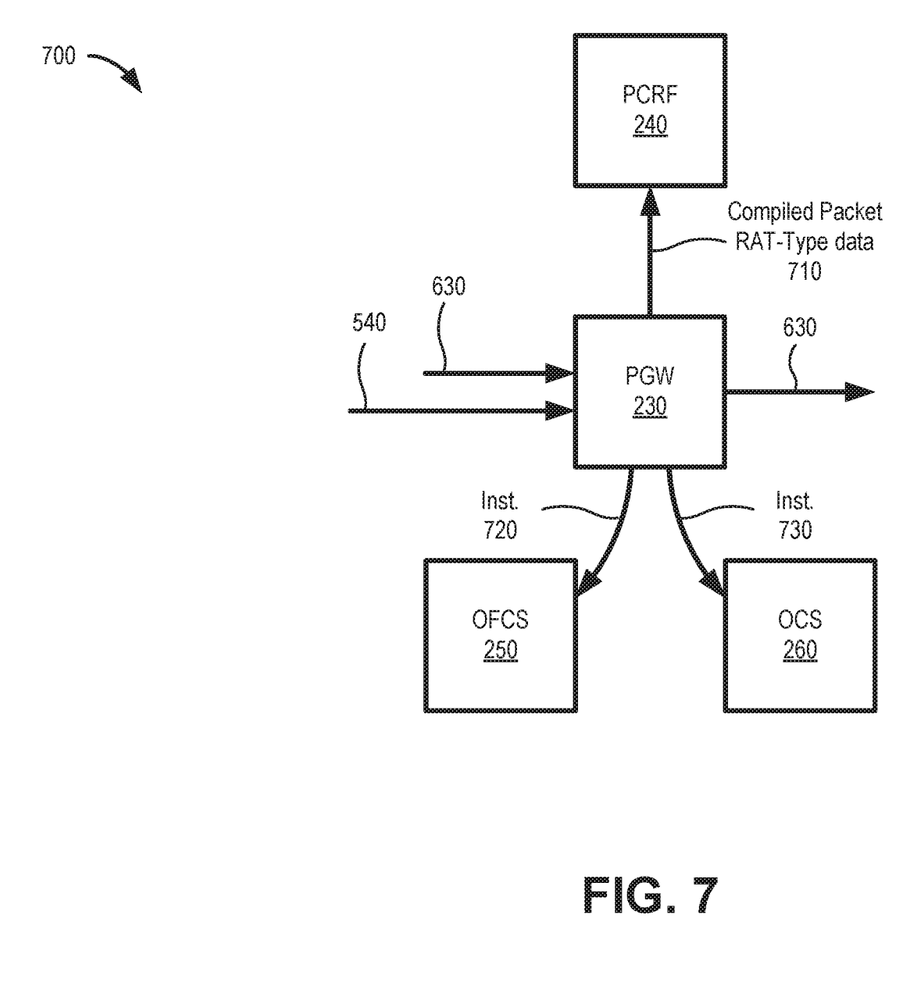
FIG. 7 is a diagram illustrating exemplary communications for enforcing policies for per-packet data transmissions over a dual-connectivity split bearer in another portion of the network environment of FIG. 2.

FIG. 7 is a diagram illustrating exemplary communications for enforcing per-packet data transmissions over a dual-connectivity split bearer in a portion 700 of network environment 100. Network portion 700 may include PGW 230, PCRF 240, OFCS 250, and OCS 260.

As shown in FIG. 7, PGW 230 may receive downlink feedback report 540 (FIG. 5) and uplink marked packets 630 (FIG. 6). PGW 230 (e.g., uplink packet analyzer 422) may use the RAT-type indicator in each of marked packets 630 to associate the packets with one of E-UTRAN 130-1 or 5G NR RAN 130-2. PGW 230 may then forward the uplink packets 630 toward an intended destination (e.g., in PDN 160). PGW 230 may compile data extracted from marked packets 630 and downlink feedback report 540. In one implementation, PGW 230 may analyze the compiled data to determine the amount of usage (e.g., in bytes or megabytes of data) by end device 110 of E-UTRAN 130-1 and 5G NR RAN 130-2. In another implementation, PGW 230 may provide raw data or compiled data from marked packets 630 and downlink feedback report 540 to another network device in core network 140 for analysis.

In one implementation, PGW 230 may provide compiled packet RAT-type data 710 to PCRF 240. Compiled packet RAT-type data 710 may include a breakdown of the number of packets or data amounts provided to/from end device 110 over E-UTRAN 130-1 and 5G NR RAN 130-2, respectively. Compiled packet RAT-type data 710 may be used by PCRF 240, for example, to shape policies for end devices 110 using dual-connectivity split bearers. PCRF 240 may, for example, adjust an access point name (APN) aggregate maximum bit rate (AMBR) for a data flow to end device 110. PGW 230 may also enforce QoS or other policies for future uplink and downlink packets for end device 110 based on existing policies for dual-connectivity split bearers.

PGW 230 may use compiled packet RAT-type data 710 to provide instructions 720 to OFCS 250 and instructions 730 to OCS 260. OFCS 250 may receive instructions 720 from PGW 230 via an Rf interface and implement charging for an account associated with end device 110. OCS 260 may receive instructions 730 from PGW 230 via a Gy interface and implement real-time charging, data limits, etc.

While FIG. 7 illustrates exemplary communications for enforcing per-packet data transmissions over a dual-connectivity split bearer, according to other embodiments, network elements of network portion 700 may perform additional, different, and/or fewer communications. Alternatively, new or modified messages and/or new or modified interfaces associated with the network elements may be implemented to accomplish similar tasks as described.

Figure 8:
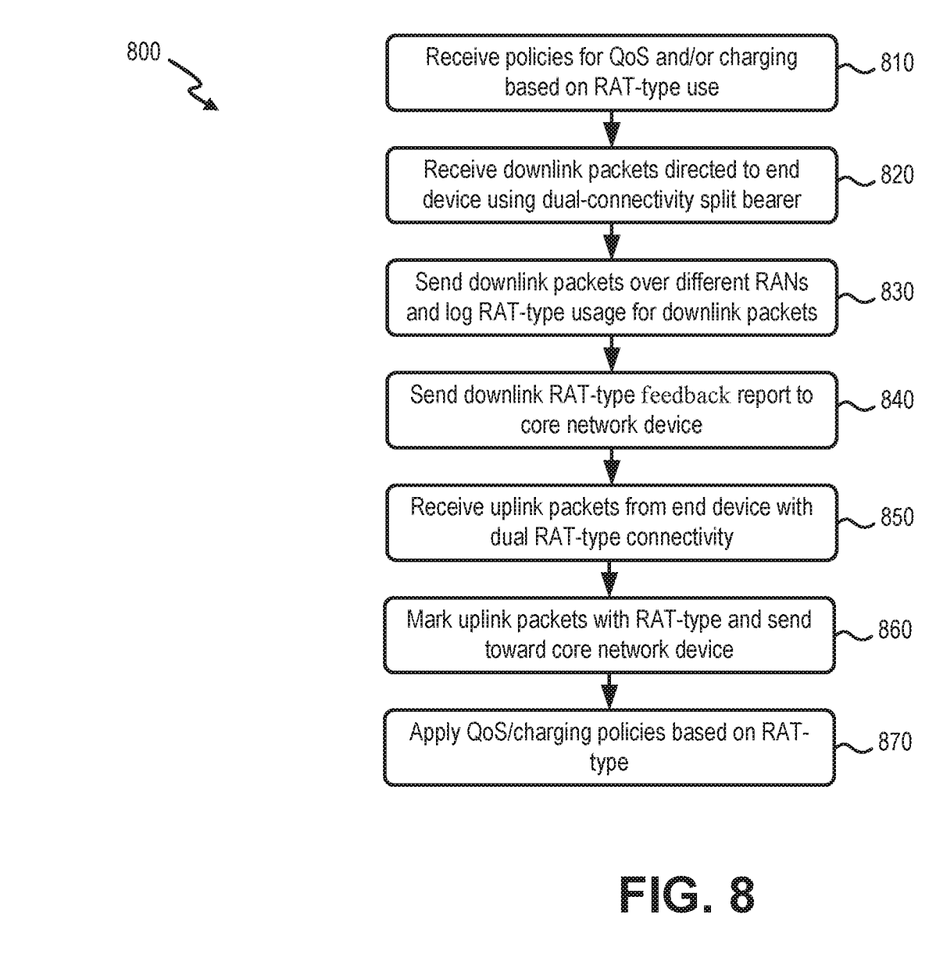
FIG. 8 is a flow diagram illustrating an exemplary process for tracking and enforcing policies for per-packet data transmissions over a dual-connectivity split bearer, according to an implementation described herein.

FIG. 8 is a flow diagram illustrating an exemplary process 800 for tracking and enforcing policies for per-packet data transmissions over a dual-connectivity split bearer, according to an implementation described herein. In one implementation, process 800 may be implemented by one or more wireless station 120. In another implementation, process 800 may be implemented by wireless station 120 in conjunction with one or more other devices in network environment 100.

Referring to FIG. 8, process 800 may include receiving policies for QoS and/or charging based on RAT-type use (block 810), and receiving downlink packets directed to an end device using a dual-connectivity split bearer (block 820). For example, PCRF 240 may provide policies to PGW 230 for a particular bearer. In one implementation, the policies may include different treatment for use of E-UTRAN 130-1 and 5G NR RAN 130-2. With a dual-connectivity wireless connection to end device 110 established, PGW 230 may receive packets (e.g., from PDN 160) and forward the packets toward end device 110 via SGW 220 and gNB 210.

Process 800 may also include sending downlink packets over different RANs and logging RAT-type usage for the downlink packets (block 830). For example, gNB 210 may receive packets from SGW 220 and determine to route packets over both E-UTRAN 130-1 and 5G NR RAN 130-2. Some packets (e.g., packets A 520 of FIG. 5) may be routed over an X2-U interface to eNB 205 for delivery via E-UTRAN 130-1 and other packets (e.g., packets B 530 of FIG. 5) may be routed over 5G NR RAN 130-2.

Process 800 may further include sending a RAT-type usage report to a core network device (block 840). For example, gNB 210 may send downlink feedback report 540 to PGW 230 via SGW 220. Downlink feedback report 540 may include information regarding the RAT-type used for multiple downlink packets (e.g., including packets A and B of FIG. 5, and other packets).

Process 800 may further include receiving uplink packets from an end device using the dual-connectivity split bearer (block 850), and marking the uplink packets with a RAT-type indicator and forwarding the marked packets to a core network device (block 860). For example, as described in connection with FIG. 6, gNB 210 may receive uplink packets C 610 and uplink packets D 620. gNB 210 may mark each packet with a RAT type indicator corresponding to the RAT over which the packet was delivered (e.g., E-UTRAN 130-1 or 5G NR RAN 130-2). In one implementation, packet marking may be added as a RAT-type indicator in the GTP header of each packet before each uplink packet is forwarded by gNB 210.

Process 800 may also include applying QoS and/or charging policies based on the RAT-type (block 870). For example, PGW 230 may receive downlink feedback report 540 and marked packets 630. In one implementation, PGW 230 may compile RAT-type indications for uplink and downlink packets to determine an overall usage amount of E-UTRAN 130-1 or 5G NR RAN 130-2 by end device 110. PGW 230 may use the compiled packet RAT-type data to enforce policies for end device 110, update policies at PCRF 240, provide instructions/data to OFCS 250, and/or provide instructions/data to OCS 260.

Systems and methods described herein enable differentiated QoS and charging policies to be applied at a PGW based on RAT-types used for uplink or downlink. The system and methods use packet delivery feedback reports from a dual connectivity anchor point to report the RAT-type used for downlink packet transmission. The dual connectivity anchor point may mark packets to indicate the RAT-type used for uplink packets. Alternatively, packet delivery feedback reports may be generated for both downlink and uplink packets. Based on the feedback reports and/or packet markings, the PGW may enforce differentiated QoS and charging policies based on RAT-type used.

The foregoing description of implementations provides illustration and description, but is not intended to be exhaustive or to limit the invention to the precise form disclosed. Modifications and variations are possible in light of the above teachings or may be acquired from practice of the invention. For example, while a series of blocks have been described with regard to FIG. 8, and message/operation flows with respect to FIGS. 5-7, the order of the blocks and message/operation flows may be modified in other embodiments. Further, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A wireless station, comprising:
    a plurality of radio access technologies (RATs);
    a first communications interface for sending or receiving packets using a wireless access network;
    a second communications interface for sending or receiving packets via another wireless station;
    one or more memories to store instructions; and
    one or more processors configured to execute the instructions to:
        receive, from a core network associated with the wireless station, downlink packets directed to an end device that is using a dual-connectivity split bearer;
        direct delivery of the downlink packets over different radio access networks (RANs) of the dual-connectivity split bearer via the first communication interface and the second communication interface;
        log a particular RAT from the plurality of RATs that was used to deliver each of the downlink packets, wherein the logging includes identifying one of a first RAT or a second RAT used to deliver each of the downlink packets;
        send, based on the logging, a downlink RAT feedback report to a network device in the core network;
        receive, via the first communication interface and the second communication interface, uplink packets from the end device using the dual-connectivity split bearer;
        mark each of the uplink packets with an indicator identifying one of the first RAT or the second RAT that was used to receive each of the uplink packets; and
        forward the marked uplink packets to the network device in the core network.

2. The wireless station of claim 1, wherein, when directing delivery of the downlink packets, the one or more processors are further configured to execute the instructions to:
    send some of the downlink packets, using the first communication interface, over a Fifth Generation New Radio (5G NR) radio access network (RAN); and
    send other of the downlink packets, using the second communication interface, to an evolved Node B (eNB) for an Evolved UMTS Terrestrial Radio Access Network (E-UTRAN).

3. The wireless station of claim 1, the one or more processors being further configured to execute the instructions to:
    generate the downlink RAT feedback report based on the logging, wherein the downlink RAT feedback report identifies a range or sequence of downlink packets sent over the first RAT for the dual-connectivity split bearer.

4. The wireless station of claim 3, wherein the downlink RAT feedback report further includes one or more of:
    a range or sequence of packet numbers that were dropped by the wireless station, or
    a report category of initial, intermediate, or final.

5. The wireless station of claim 1:
    wherein when sending the downlink RAT feedback report, the one or more processors being further configured to execute the instructions to:
        send the downlink RAT feedback report to the network device via an S1-U interface; and
    wherein, when forwarding the marked uplink packets to the network device, the one or more processors being further configured to execute the instructions to:
        forward the marked uplink packets via the S1-U interface.

6. The wireless station of claim 1, wherein, when marking each of the uplink packets, the one or more processors are further configured to execute the instructions to:
    insert the indicator in a General Packet Radio Service (GPRS) Tunneling Protocol (GTP) header for each packet.

7. The wireless station of claim 1, wherein the one or more processors are included within a next generation Node B (gNB) for a Fifth Generation New Radio (5G NR) radio access network (RAN).

8. The wireless station of claim 1, wherein the second communication interface includes an X2-U interface.

9. A method, comprising:
    receiving, by a wireless station and from a core network associated with the wireless station, downlink packets directed to an end device that is using a dual-connectivity split bearer;
    directing, by the wireless station, delivery of the downlink packets over different radio access networks (RANs) of the dual-connectivity split bearer;

logging, by the wireless station, a particular radio access technology (RAT) from a plurality of RATs that was used to deliver each of the downlink packets, wherein the logging includes identifying one of a first RAT or a second RAT used to deliver each of the downlink packets;

sending, by the wireless station and based on the logging, a downlink RAT feedback report to a network device in the core network;

receiving, by the wireless station, uplink packets from the end device using the dual-connectivity split bearer;

marking, by the wireless station, each of the uplink packets with an indicator identifying one of the first RAT or the second RAT that was used to receive each of the uplink packets; and forwarding, by the wireless station, the marked uplink packets to the network device in the core network.

10. The method of claim 9, further comprising:
receiving network policies to enforce based on a particular RAT usage by the end device; and
applying the network policies based on one or more of the downlink RAT feedback report or the marked packets.

11. The method of claim 9, wherein the dual-connectivity split bearer includes an Evolved UMTS Terrestrial Radio Access Network (E-UTRAN) and a Fifth Generation New Radio (5G NR) radio access network (RAN).

12. The method of claim 9, further comprising:
generating, by the wireless station, the downlink RAT feedback report based on the logging, wherein the downlink RAT feedback report identifies a range or sequence of downlink packets sent over the first RAT and the second RAT for the dual-connectivity split bearer.

13. The method of claim 12, wherein the downlink RAT feedback report further includes one or more of:
a range or sequence of packet numbers that were dropped by the wireless station, or
a report category of initial, intermediate, or final.

14. The method of claim 9, wherein the sending includes:
sending the downlink RAT feedback report to the network device via an S1-U interface.

15. The method of claim 9, wherein marking the uplink packets includes:
inserting the indicator in a General Packet Radio Service (GPRS) Tunneling Protocol (GTP) header.

16. The method of claim 15, further comprising:
reading, by the network device in the core network and from the GTP header, the indicator for each of the uplink packets.

17. The method of claim 9, further comprising:
compiling data extracted from the marked packets and the downlink RAT feedback report.

18. The method of claim 9, further comprising:
providing, to a policy charging rules function (PCRF) device in the core network, packet analysis of a particular RAT usage by the end device.

19. A non-transitory computer-readable medium containing instructions executable by at least one processor, the computer-readable medium comprising one or more instructions to cause the at least one processor to:
receive, from a core network associated with a wireless station, downlink packets directed to an end device that is using a dual-connectivity split bearer;
direct delivery of the downlink packets over different radio access networks (RANs) of the dual-connectivity split bearer;
log a particular radio access technology (RAT) from a plurality of RATs that was used to deliver each of the downlink packets, wherein the logging includes identifying one of a first RAT or a second RAT used to deliver each of the downlink packets;
send, based on the logging, a downlink RAT feedback report to a network device in the core network;
receive uplink packets from the end device using the dual-connectivity split bearer;
mark each of the uplink packets with an indicator identifying one of the first RAT or the second RAT that was used to receive each of the uplink packets; and
forward the marked uplink packets to the network device in the core network.

20. The non-transitory computer-readable medium of claim 19, further comprising instructions to cause the at least one processor to:
generate the downlink RAT feedback report based on the logging, wherein the downlink RAT feedback report identifies a range or sequence of downlink packets sent over the first RAT for the dual-connectivity split bearer and a range or sequence of downlink packets sent over the second RAT for the dual-connectivity split bearer.

* * * * *